United States Patent [19]

Williams et al.

[11] Patent Number: 4,677,364
[45] Date of Patent: Jun. 30, 1987

[54] REACTIVE POWER COMPENSATING SYSTEM

[75] Inventors: Timothy J. Williams, Redondo Beach, Calif.; Mohamed A. El-Sharkawi, Renton; Subrahmanyam S. Venkata, Seattle, both of Wash.

[73] Assignee: The United States of America as represented by the United States Department of Energy, Washington, D.C.

[21] Appl. No.: 688,675

[22] Filed: Jan. 4, 1985

[51] Int. Cl.[4] .......................... H02P 9/46; G05F 1/70
[52] U.S. Cl. ....................................... 322/47; 322/95; 323/210; 323/211
[58] Field of Search ..................... 322/47, 29, 95, 24, 322/25, 28, 32, 89, 90, 59

[56] References Cited

U.S. PATENT DOCUMENTS 4,242,628 12/1980 Mohan et al. .................... 322/47 X
4,417,194 11/1983 Curtiss et al. ........................ 322/47

Primary Examiner—R. J. Hickey
Attorney, Agent, or Firm—Robert Southworth, III; Judson R. Hightower

[57] ABSTRACT

The reactive power of an induction machine is compensated by providing fixed capacitors on each phase line for the minimum compensation required, sensing the current on one line at the time its voltage crosses zero to determine the actual compensation required for each phase, and selecting switched capacitors on each line to provide the balance of the compensation required.

9 Claims, 11 Drawing Figures

REACTIVE POWER COMPENSATING SYSTEM

BACKGROUND OF THE INVENTION

The government has rights in this invention pursuant to Contract No. DE-AC79-83BP22849 and the Bonneville Power Administration.

The invention relates to a system for compensating reactive power of an induction machines (motor or generator).

Induction machines came into existence nearly 100 years ago, with most machines finding their use as motors. However, the machines can be used as generators, and literature covering the induction generator dates back to near the turn of the century. Nevertheless, induction generators have seen little use over the years, due to stability concerns and their demand for a supply of reactive power. Other machines, such as synchronous or dc generators, which do not have such demands have been used instead. In recent years the use of the induction machine as a generator has begun to grow in popularity once again, because in a number of applications it is found to be superior to the synchronous generator, for reasons listed in the following Table 1.

TABLE 1

Comparison and Inherent Characteristics of Induction and Synchronous Generators

| Induction Generator | Synchronous Generator |
|---|---|
| Excitation by separately connected power source (capacitors or grid) | Excitation by dc source |
| No brushes or rings (for squirrel cage type rotor) | Normally uses brushes and rings |
| No synchronization controls needed (except phase sequence) | Requires careful synchronization of speed, voltage, phase shift and phase sequence with the power line |
| Efficiency varies with size - normal to maximum 80–95%, respectively | Efficiency higher - up to 97% |
| Power factor (lagging) varies with speed | Power factor varies with excitation |
| Low maintenance | Regular maintenance of brushes |
| Cannot sustain large fault currents | Can sustain large fault currents |

Because of these advantageous features of the induction generator, small and medium-sized generators (up to 1 MW) have been used in several applications: in gas/steam flow systems, in small hydros, in recovering energy from compression in natural gas pipelines and from waste-steam turbines, in generation from geothermal steam sources and from wind energy. It is this latter area toward which this work is directed. Larger size units, in the 1–10 MW range, may find use for wind, small-hydro, and other cogeneration applications.

As was mentioned before, it is the induction generator's demand for supply of reactive power that has hindered its widespread use. Supplying this reactive power causes a variety of problems for the electric utility:

Generation and transmission equipment are rated in terms of kVA, since their losses and heating are determined mainly by total currents and voltages, independent of power factor. Size and cost are roughly proportional to this kVA rating, and so cost for supplying a given amount of active power is approximately inversely proportional to power factor. Thus, poor power factor leads to increased costs to the utility.

Poor voltage regulation occurs when large amounts of reactive power are drawn, due to attendant voltage drops in the transmission system by the reactive current.

In addition, the reactive power problem is compounded with induction generators, since the generation process supplies real power to the utility while drawing reactive power. This problem has been noticed with Small Wind Energy Conversion Systems (SWECS) using induction generators.

METHODS OF REACTIVE POWER COMPENSATION

The techniques that have been employed to compensate the demand for reactive power for inductive loads are quite varied, and depend on the desired application. Many of these methods (mentioned below) have been developed for induction motors, though they normally apply to induction generators as well.

A. Synchronous Compensation

Because synchronous motors can operate with a leading power factor, they are used to supply the lagging reactive power demanded by inductive loads. When connected to a system and run unloaded, solely to function as power factor correctors, these machines are referred to as synchronous condensors. Since this method is somewhat complex, it is usually reserved for very large systems, where other approaches are not as economical.

B. Fixed Capacitance

Using fixed capacitors with inductive loads in general and with induction machines in particular to locally supply the needed reactive power has been a popular approach for many years. Since capacitors operate with a leading current, they can be connected to inductive loads to improve the power factor. They are most useful where the demand for reactive power is fixed.

Because capacitors can be used to completely supply the reactive power needed for an induction machine, they can be used to self-excite it even when its stator is not connected to an ac supply. This allows an induction generator to operate in a stand alone setting, not connected to a grid, with some means used to drive the rotor.

C. Switched Capacitance

The use of a number of switchable capacitors in parallel allows compensation for active and passive loads that have a varying demand for reactive power. Induction machines exhibit this feature of changing reactive power draw as their speed changes. This method of compensation allows the amount of reactive compensation supplied to be changed in a discrete number of steps. The disadvantages of this method are the increased number of parts required, and the fact that compensation is in discrete steps.

D. T. Bernays reported such a scheme for voltage control in a stand alone, single-phase induction generator in a paper titled "A Low Cost Single Phase Induction Generator" IEE Power Electronics Specialists Conference, 1982, pp. 185–196. The capacitors were switched as required to supply the needed reactive power in order to regulate the voltage output from the generator.

D. Fixed Capacitance with a Switched Inductor

Where a continuously-variable supply of reactive power is desired, a thyristor controlled reactor (TCR)

can be used in parallel with a fixed amount of capacitance. The fixed value of capacitance is set to supply the maximum reactive power needed. Then by adjusting the firing angle, the thyristors control the current inside the inductors. Variable amounts of reactive power can be absorbed by the inductors, leaving the appropriate amount for the load.

The advantages of this method are its ability to allow a continuous VAR compensation, its very fast speed of response (can be about one-half cycle) and the reduced number of parts over a system that uses many switched capacitors. Because of these features, this technique is often employed with large loads that have very rapidly changing needs for reactive power. One such application is in electric arc furnaces. This system can also be used in power factor correction of a load which is itself controlled by thyristor firing.

One major problem with this approach is that it necessarily causes harmonic curents to flow, due to the switching of the inductors. For example, it is reported that the 5th and 7th harmonics for wye connected inductors could have maximum amplitudes relative to the fundamental of about 8 and 4 percent ($-22$ and $-28$ dB), respectively. In a delta connection, the dominant harmonics are the 3rd, 5th, 7th and 9th which can have respective amplitudes of up to 13.8, 5.0, 2.5 and 1.6 percent ($-17$, $-26$, $-32$, and $-36$ dB) relative to the fundamental.

Another potential problem that occurs in a large system using a TCR is that of losses. When the TCR is operated and no reactive power is needed by the load, the thyristors are switched on to allow the inductor current to flow 100 percent of the time. In this case, the capacitor and inductor reactive power just cancel out, and full reactive current circulates between the capacitor and inductor. In a very large system, this circulating current could cause large undesired power losses.

E. Fixed Capacitance, One Controlled Inductor

A variation on the previous method is to have just one inductor, which is switched among the 3 phases. This decreases the number of inductors needed, though the number of switches remains the same, with the complexity of the switching increasing. The size of the harmonic currents also increase.

F. Combination—Switched Capacitors and a TCR

Another variation of the above methods is to use both switched capacitors and a TCR. This is done to reduce losses in the compensator when no VAR compensation is needed by the load. This method of using switched capacitors allows a small inductor to be used in the TCR. As a result, losses due to the circulating reactive current are reduced. Due to the complexity of this system, its use is only warranted in very large systems where curtailing such losses becomes important.

G. Solid State Power Factor Controllers (Nola type)

A different approach for correcting the power factor in induction machines was developed by Nola for the National Aeronautics and Space Administration. Since induction machines are well known to operate with a poor power factor when lightly loaded, Nola-type controllers operate by sensing the machine's power angle, and adjusting the voltage into the machine by means of a triac (or SCRs) placed between the ac supply and the motor. Since the motor does not need full voltage to run when driving a small load, the reduced voltage allows the motor to run with reduced magnetizing currents, which improves the power factor.

The controller does appear to be successful in reducing the energy consumption in motors, and in improving their power factor somewhat. However, problems arise in considering their applications for induction generators:

Because of the triac switching, these controllers generate harmonic currents in both the line and in the machine (note that TCRs do not generate any additional harmonic currents inside the machine).

These controllers do not really provide reactive power compensation. Rather, they are designed to hold the machine to a predetemined power factor. Thus, high power factor operation (close to unity) is not possible with these controllers.

In addition, the best performance of these controllers occurs under very light loads, where the power factor is the worst. When induction generators are used in the specific application of wind-driven generation, control circuitry is usually implemented to take the generator off line when operated at very low power levels.

Finally, the real success of the Nola controller is subject to some controversy. Because of the chopped waveforms that result from use of the controller, the true power factor is no longer simply determined as Nola literature contends. This study in fact contends that a constant power factor controller can actually lead to increased power consumption under some loading conditions.

A Parker Electronics controller, similar to the Nola one, uses the same triac control on the induction machines, but the load sensing mechanism is different. Parker's circuit senses inrush current to the motor when the triac fires in order to detect the load. The National Bureau of Standards has studied and supported this controller, but it too was met with scepticism by others who question the validity of this method of sensing the load.

H. Unity Power Factor Induction Machines

Another approach to the reactive power problem in induction machines involves winding the machine in such a way that the machine generates its own reactive power. The approach has been tested on machines up to 35 hp. Though in the experimental stages, this approach which involves changing the machine design looks promising. Lower efficiency is one of the disadvantages of this approach.

OBJECTS AND SUMMARY OF THE INVENTION

An object of this invention is to develop a reactive power compensator for induction machines used in, for example, the application of wind energy, where ruggedness and simple operation are important considerations for the task. A compensator is desired to be simple, inexpensive, and easily adaptable to the changing speeds of the machines. It is also desired to be modular to fit various sizes of machines. Other considerations in the development of this invention are that it produce negligible harmonic currents in either the line or in the machine itself. In light of the factors discussed in the various compensation techniques of the prior art, the choice has been made to achieve the objectives of the invention with a system of switched capacitors, which would have several advantages over existing reactive power compensators:

The circuit can (ideally) be developed to avoid any harmonic currents or voltages, providing a harmonic free voltage source is available.

Because very fast response time is not a crucial factor in such an application, the capacitor system should be able to respond as rapidly as necessary (within a few cycles) to changing demands for reactive powr from the generator.

Based on preliminary investigation of induction generator operation, a system with only a few capacitors per phase should be able to correct the power factor of the induction generator over the complete operating region into the range typically desired by utilities.

These and other objects are achieved in a 3-phase reactive power compensating system by an array of binary weighted switchable capacitors for each phase, a fixed capacitor, and means for measuring the reactive power being drawn by an induction machine, means for converting that measurement into a binary code, and means for selectively switching on the number of capacitors corresponding to the binary code to compensate for the reactive power drawn by an induction machine. Timing means responsive to each phase controls the means for selectively switching on the appropriate capacitors in a timed relationship for each phase. The one fixed capacitor is provided for each phase for the minimum compensation required by each phase of reactive power. The array of switchable capacitors then provides the balance of the compensation required.

DESCRIPTION OF PREFERRED EMBODIMENTS

An induction machine can have two different types of rotors: either phase-wound, or a squirrel-cage. The type to be used will depend on the application. The wound rotor consists of three-phase windings similar to those in the stator, with terminals brought out via slip rings. The squirrel-cage rotor consists of bars connected together at their ends, and no slip rings are needed. The squirrel cage is the preferred type for wind energy applications, since it is more durable than the wound rotor.

The basic operation of the induction machine can be understood by looking at the operation of the machine when used as a motor. The stator is connected to the ac supply which creates a rotating magnetic field in the airgap. This rotating field induces currents in the rotor circuit of the machine, which in turn develops an electromagnetic torque in the shaft of the motor.

Generator operation is very similar. When the rotor is driven mechanically so that it rotates faster than the synchronous speed of the rotating field, electrical energy is delivered by the machine to the source.

Figure 1:
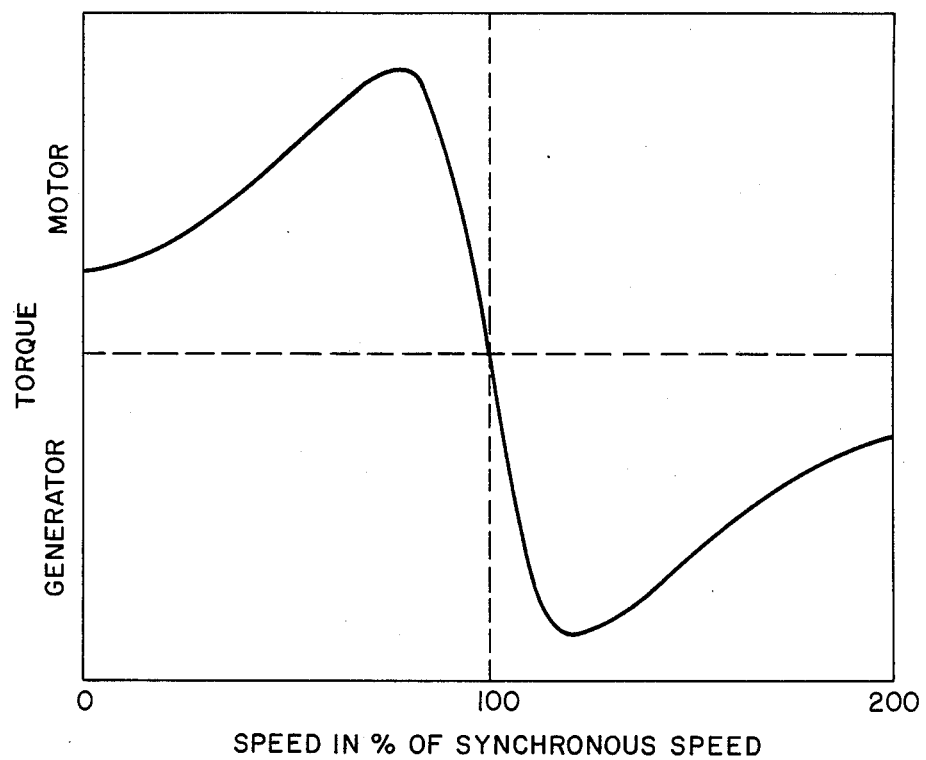
FIG. 1 is a graph illustrating the speed-torque characteristic of an induction machine.

The speed-torque characteristic for an induction machine is shown in FIG. 1. The figure shows generator speed. If the rotor is connected to another machine (such as a dc machine), the induction machine can operate in either generating or motoring modes.

Figure 2:
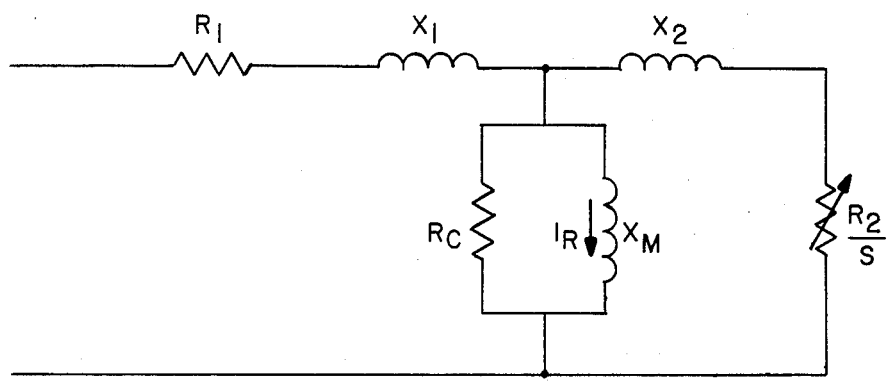
FIG. 2 is a circuit diagram of an induction machine model.

The model of a three-phase induction machine on per phase basis is shown in FIG. 2. As the rotor speed approaches synchronous speed, the per-unit slip (s) decreases. As the model shows, for either motoring or generating operation, the machine will draw some reactive magnetizing current, given approximately by $$I_r \approx V/X_m. \qquad (1)$$

In normal motor operation, the machine is connected to the utility grid, which supplies reactive power for the motor. If the machine is connected to a grid and run as a generator, the grid will again supply the needed reactive power for the generator and for other inductive loads, though this places heavy demand on the utility for such reactive power.

The fundamental objective of this invention is to come to an economical solution which accomplishes the goal of adequate reactive power compensation. To achieve this, it is desired to use the fewest number of capacitors (switched or fixed) per phase that will be able to furnish enough reactive power to correct the power factor into the desired range throughout the operating region. Circuitry which is simple, inexpensive, and reliable must be developed for proper switching of these capacitors. A final consideration is to avoid adding any adverse effects into the overall system, such as harmonics, transient currents, or large power losses.

The key parameter of the system is the amount of reactive power drawn by the induction machine (referred to as a generator hereinafter although it could be an induction motor instead). Measuring only the power factor will not reveal the amount of reactive power drawn by the machine. In order to provide online compensation, the reactive power must be sensed. From this information the correct number of capacitors must be switched on to minimize the amount of reactive power drawn from the utility drawn by the induction generator.

Figure 3:
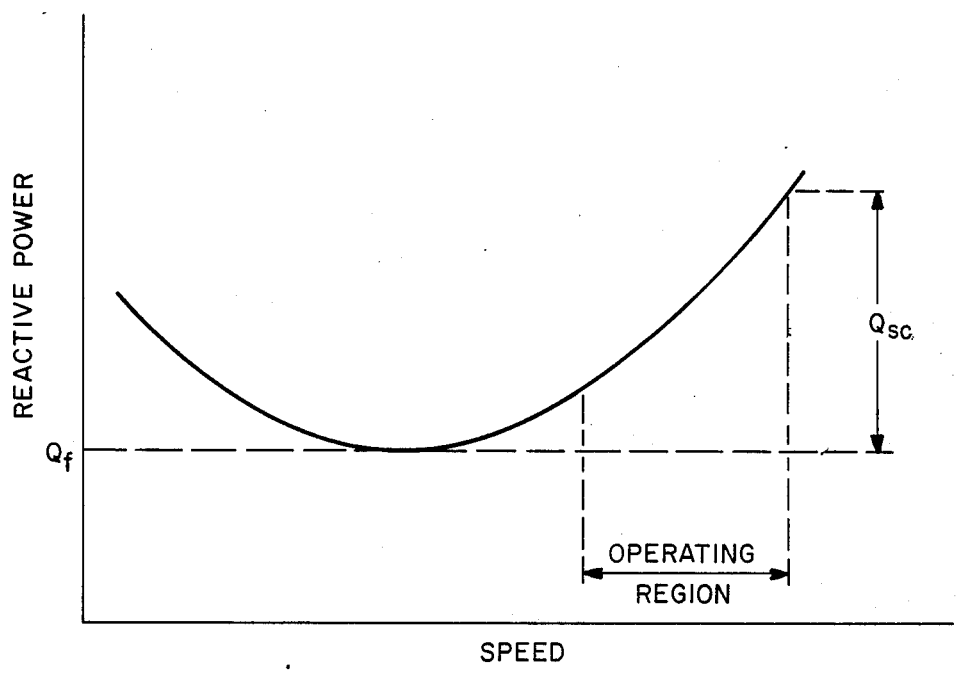
FIG. 3 is a graph illustrating a typical reactive power profile for an induction generator.

In selecting capacitors, the reactive power profile of a given induction machine (amount of reactive power drawn vs. speed) must be known. Once this profile is available, capacitor selction becomes straightforward. A typical profile is given in FIG. 3. It shows that the compensation is divided into two regions: the minimum amount of fixed reactive power ($Q_f$) which should be supplied by fixed capacitors connected to the machine when it is in operation, and the varying amount of reactive power above this minimum which is provided by switchable capacitors. In an actual application, it may be desired to adjust $Q_f$ to a value less than the minimum reactive power needed by the machine, so that possible problems of self-excitation can be avoided.

The value of the fixed capacitance ($C_f$) per phase needed to compensate $Q_f$ is found from the relation $$C_f = Q_f/(3V^2\omega) \quad (2)$$

where V is the line-to-line voltage and is the electrical angular velocity (377 radians/sec for 60 Hz). Equation ([2-]2) assumes that these three fixed capacitors are connected in delta.

Now the reactive power required to be compensated by the switching capacitors ($Q_{sc}$) is the maxmum reactive power drawn by the generator in the operating range minus $Q_f$. To supply the maximum amount of reactive power with the fewest number of capacitors, and still allow as many different steps of switchable capacitance as possible, the capacitors should be sized in the common binary ratios: 1, 2, 4, 8, etc. For the prototype system disclosed here, the decision was made to use 3 capacitors weighted 1, 2 and 4 in each phase. This appeared to be the minimum number that could provide adequate compensation, and still keep the electronic circuit fairly simple. The following analysis, however, will be made assuming n capacitors selected per phase.

For n capacitors in these binary ratios, let the smallest size have a capacitance of C0. Then the total capacitance per phase ($C_t$) to be switched is $$C_t = (2^n - 1)C0 \quad (3)$$

where n is the number of capacitors per phase. To simplify the switching circuit, the capacitors are connected in wye, with each capacitor connected between a supply line and the neutral of the machine. Since $V_{1-1}$ is 3 $V_{1-n}$, this value of capacitance is $$C_t = Q_{sc}/(V^2\omega) \quad (4)$$

where the factor of 3 in equation (2) no longer appears. This shows that the convenience of connecting the capacitors to the neutral is met by the trade-off of having to use larger capacitors. The value of the individual capacitors are now given by equation (3), with C0 being the smallest, C1=2*C0 being next, then C2=4*C0, etc. There will be ($2^n - 1$) different values of capacitance to be switched in. For example, the choice of 3 switchable capacitors leads to 7 distinct steps (in addition to zero) of reactive power compensation. The theory governing the decision on switching is as follows.

Let Q0 be the amount of reactive power that the smallest capacitor supplies. Then each high switching step will add additional reactive power up to a maximum of ($2^n-1$)*Q0 when all capacitors are switched in. To understand when each capacitor should be switched, assume that the machine (with its fixed capacitors) initially draws no reactive power. When the reactive power drawn by the machine increases to one-half Q0, the first capacitor is switched on. With C0 switched in at this point, the power factor should be slightly leading, since C0 over compensates the system by one-half Q0. As the demand for reactive power continues to increase, the power factor goes through unity and becomes lagging again. The next capacitor range (C1 in, C0 out to supply 2*Q0) should be switched when the reactive power demand is 1.5*Q0. The power factor then again becomes slightly leading. The other values are switched as the load increases, at 2.5*Q0, 3.5*Q0, as shown in Table 2. This should keep the maximum reactive power drawn to one-half Q0, as long as the demand stays within the range that the capacitors can supply.

TABLE 2

Capacitor Switching for Varying Reactive Power Demand, for the case n = 3

| Q drawn by generator | State of Capacitor Switch | | | Q supplied |
|---|---|---|---|---|
| | C2 | C1 | C0 | |
| Q < 0.5*Q0 | off | off | off | 0 |
| 0.5*Q0 < Q < 1.5*Q0 | off | off | on | 1*Q0 |
| 1.5*Q0 < Q < 2.5*Q0 | off | on | off | 2*Q0 |
| 2.5*Q0 < Q < 3.5*Q0 | off | on | on | 3*Q0 |
| 3.5*Q0 < Q < 4.5*Q0 | on | off | off | 4*Q0 |
| 4.5*Q0 < Q < 5.5*Q0 | on | off | on | 5*Q0 |
| 5.5*Q0 < Q < 6.5*Q0 | on | on | off | 6*Q0 |
| Q > 6.5*Q0 | on | on | on | 7*Q0 |

Figure 4:
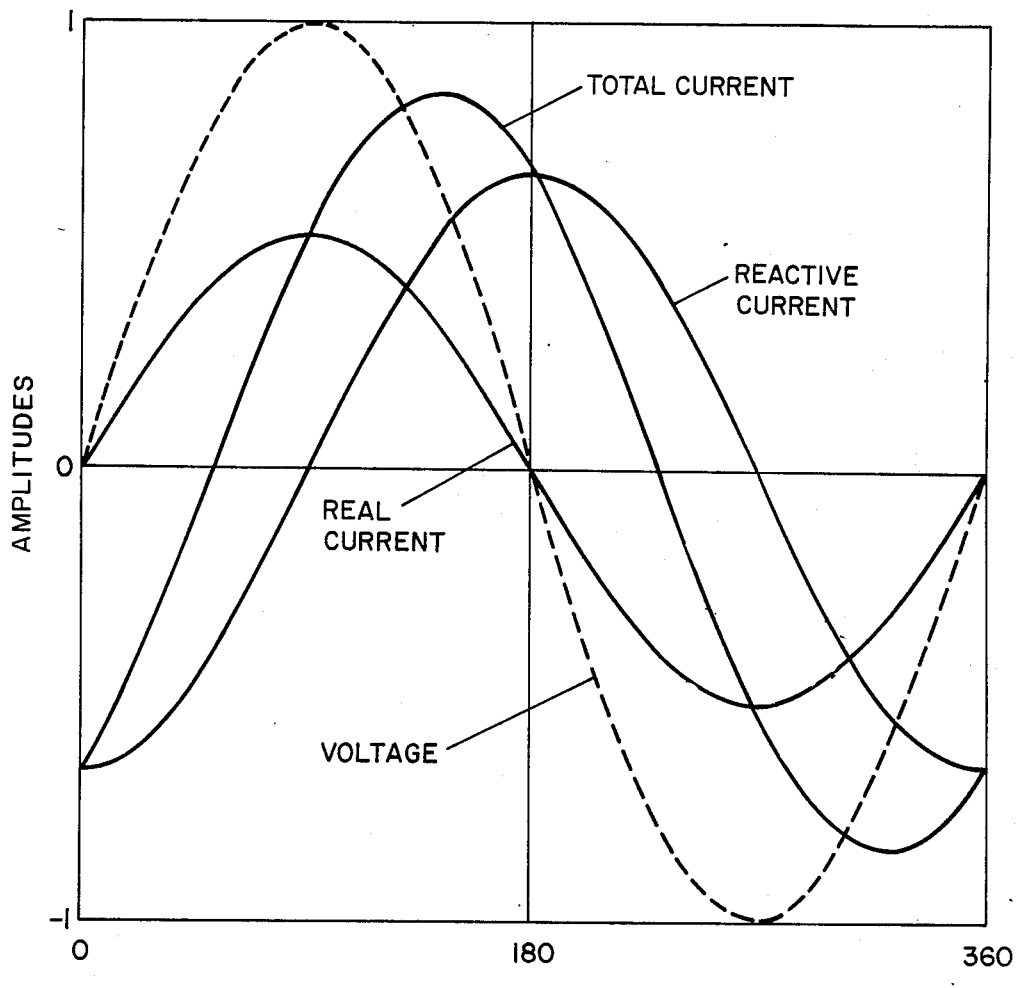
FIG. 4 is a graph illustrating the relationship of real and imaginary components of current in an inductive load.

There are a number of ways to measure the reactive power in a system. The method chosen is based on the fact that real and reactive currents are 90 degrees out of phase with the voltage (see FIG. 4). So when the (phase) voltage crosses zero, the real current is also zero, and any current measured at that point is equal to the maximum reactive current for the given load. Thus, sensing the value of the line current at the zero crossing of the voltage gives the magnitude of the maximum reactive current, $I_r$, in the line. This corresponds to a total rms reactive power of $$Q = \sqrt{3/2}VI_r \quad (5)$$

Figure 5:
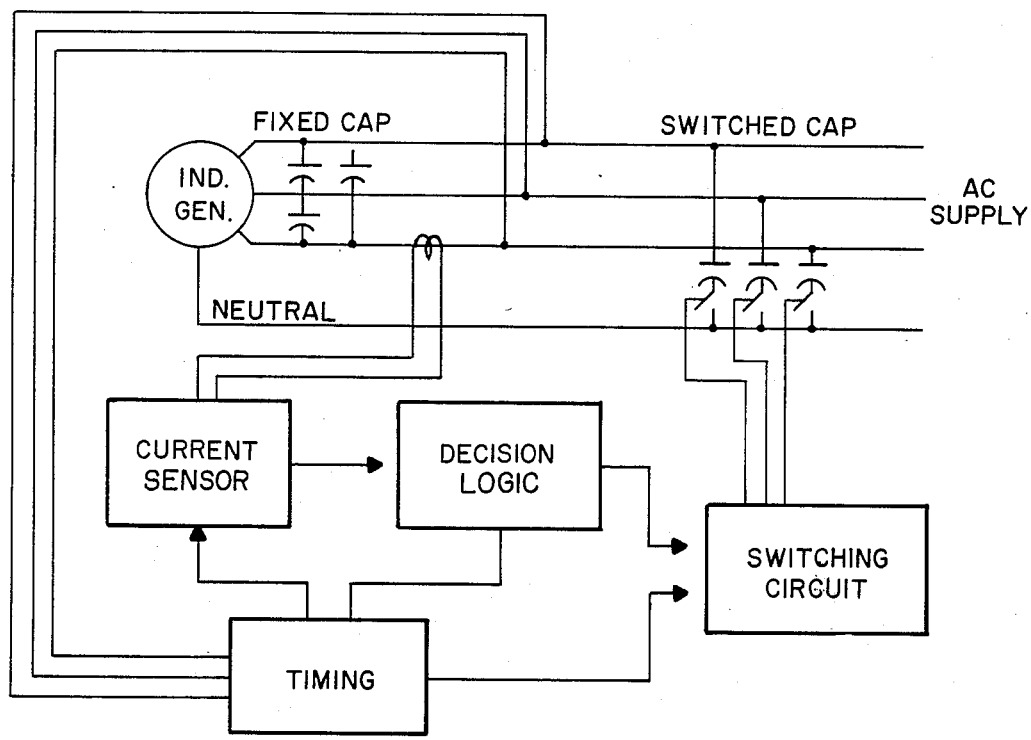
FIG. 5 illustrates a functional block diagram of the present invention.

There are four main parts to the circuit of the present invention, as shown in FIG. 5. The first is the current sensor 10, which measures the reactive power being drawn by an inductive generator 11. This information is passed to the decision logic circuitry 12 which is responsible for selecting the correct number of capacitors. A switching circuit 13 includes the capacitor arrays Ca, Cb, Cc, electronic switches Sa, Sb, Sc, and the firing mechanism for these switches. A timing section 14 completes the circuit, supplying the correct waveforms for proper timing of each section. Each part will be discussed in detail below.

All of the digital circuitry is preferably implemented in CMOS (complementary metal-oxide-semiconductor). CMOS carries the advantage over TTL (transistor-transistor-logic) of having larger noise immunity, drawing less power, and allowing for flexible power supply ranges. Speed is not an important factor, since everything operates at the standard 60 Hz frequencies. The choice of power supplies was dictated mainly by the analog circuitry (in the current sensor 10). Positive and negative 10 volt supplies were used, which provided an adequate range for the delicate sensing process.

CURRENT SENSOR CIRCUITRY

Figure 6:
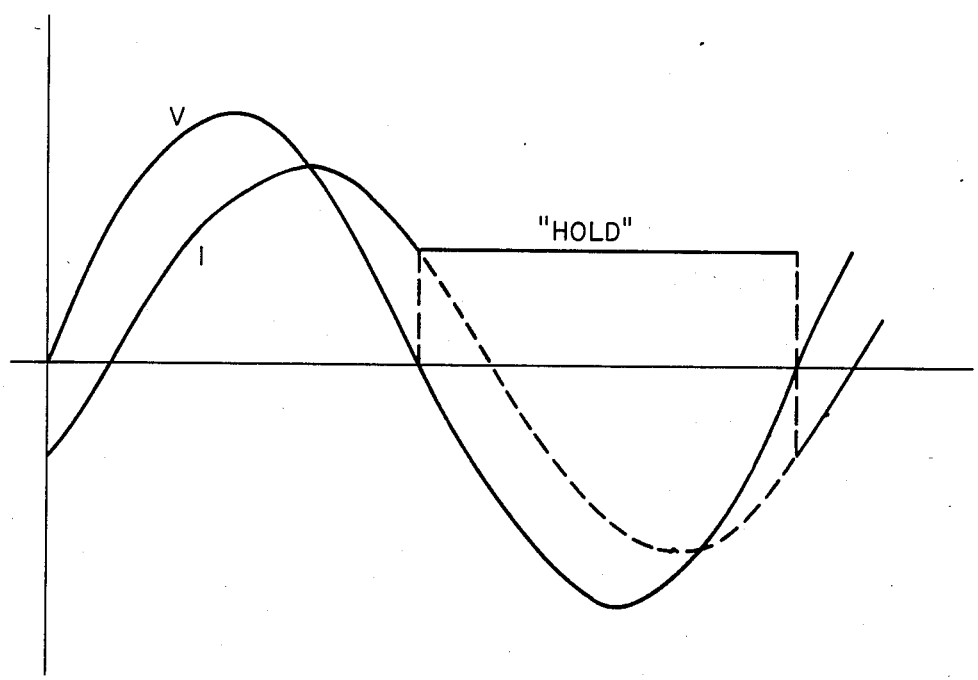
FIG. 6 illustrates the current sampling process in the system of FIG. 5.

The current sensor 10 is responsible for continually sensing the current of one phase line, adjusting its magnitude to desired levels, and then sampling and holding the current value presentl when the phase voltage crosses zero. This hold value will be fed to the decision logic 12 for determination of the number of switched capacitors to be turned on. A simple diagram of the sampling process is given in FIG. 6. Note that the reactive current lags the phase voltage. Its value, when the phase voltage crosses zero, is sampled and held.

Figure 7:
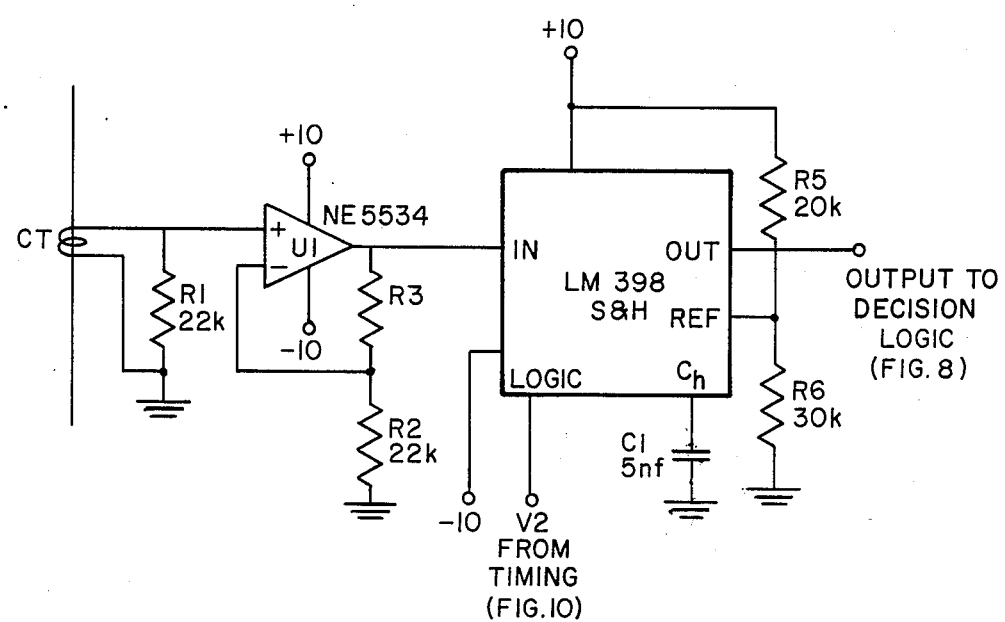
FIG. 7 illustrates the current sensor circuit of FIG. 5.

A schematic of the current sensor is shown in FIG. 7. The first element of the circuit is a current transformer 15. This element needs to be matched to the generator being used. The current in the secondary of this element is fed into a 22 ohm resistor (R1) to perform a current-to-voltage transformation. This value of R1 is small enough for the transformer used so that distortion and phase shift in the secondary current are negligible. A voltage waveform, corresponding to the line current, appears at the noninverting input of an amplifier U1; a NE 5534 operational amplifier (op amp). This op amp was selected because it has excellent low noise and offset characteristics. This is important, since the input voltages from the current sensor 15 can be very small. This voltage is $$V_i = IR1/m \qquad (6)$$

where m is the current transformer turns ratio and I is the line current.

Resistors R2 and R3 determine the amount of amplification for the op amp. For this standard noninverting configuration, the gain of the op amp is given by $$\text{Gain} = 1 + R3/R2. \qquad (7)$$

If R3/R2 is much larger than 1, then from equation (6) and equation (7), the output voltage is approximately $$V_{out} = (R3/R2)IR1/m. \qquad (8)$$

If R1 is equal to R2. the output voltage becomes $$V_{out} = IR3/m. \qquad (9)$$

Therefore for known current levels and sensor transformer ratio, the op amp output voltage is easily set via R3.

The op amp output is fed into an LM 398 Sample and Hold (S & H) circuit 16. This circuit has an output which follows its input until it receives a "hold" signal (a falling edge) at the "logic" input. This signal is timed to come at the zero crossing of the voltage, so reactive current can be measured as discussed earlier. A holding capacitor C1 is a 5000 pf polystyrene capacitor which is a typical choice for a sampling device like this. Resistors R4 and R5 set the reference voltage to be 6 volts, which is the threshold for the "hold" signal. The timing signal into the logic input is synchronized with the line-to-neutral voltage of the same line from which the current is sampled. When the voltage crosses zero (going negative), the S & H circuit locks its output into its input, which is a voltage proportional to the maximum value of the reactive current. The current at this zero crossing is the maximum value of the reactive current into the system.

The sample and hold unit used, the LM 398, has output thresholds which are approximately 2 volts away from the supply values. Thus for a +10 volt supply, the effective range is +8 volts. This was one factor which forces the use of a +10 volt negative supply, since output levels in the 0 to 2 volt range were important, but are lost by the 398 when only a single 10 volt supply is used, and is a +10 V supply.

The 8 volt maximum output of the S & H circuit is used to calibrate R3. This 8.0 volt level is fixed to correspond to a reactive power demand just equal to the maximum that the switching capacitors can supply (given in equation (4)). Zero volts is set to mean zero reactive power demand. At the maximum level, Q in equation (5) is $Q_{sc}$, and so using equation (5) in (9), the op amp (and S & H) output is $$V_{out} = 8.0 = \sqrt{2/3} Q_{sc} R3/Vm \qquad (10)$$

which gives R3 as $$R3 = 8 \sqrt{3/2} Vm/Q_{sc}. \qquad (11)$$

This can also be put in terms of the total capacitance $C_t$ to be switched per phase, by substituting $Q_{sc}$ of equation (4) into equation (11):

$$R3 = 8 \sqrt{3/2} m/C_t V. \qquad (12)$$

R3 must be set for the amount of capcitance to be switched by using one of these last two equations.

One final important note is that the current transformer 15 must be placed between the induction generator 11 (with its fixed capacitors) and the switching capacitors. This is true because the sensor measures the reactive power demand of the generator, and if the switching capacitors are on the wrong side of the current transformer, the reactive power that they supply would be included in the sensing process, and erroneous measurement would result. The system could be operated in a "closed-loop" sense, by placing the current transformer outside both the generator and switched capacitors. That involves more complex circuitry, since memory of the cycle's switch-setting would be required. But it would have an advantage of being able to provide correct compensation, even if the system calibration was incorrect (for example, by changes in the component values over time).

DECISION LOGIC CIRCUITRY

The decision logic circuit 12 (FIG. 5) uses the output of the S&H circuit 16 as its input. From this voltage, the correct capacitors to be switched on are determined.

Figure 8:
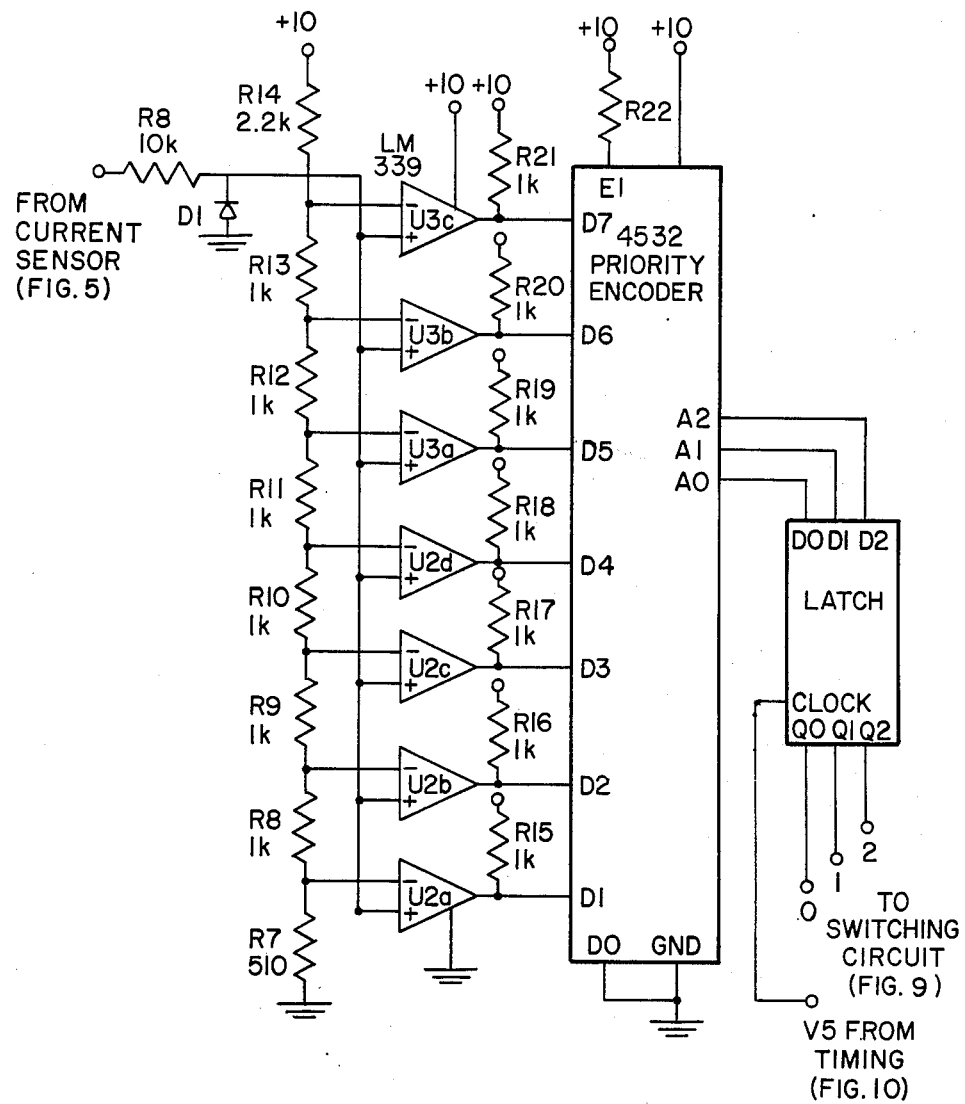
FIG. 8 illustrates the decision logic circuit of FIG. 5.

FIG. 8 shows a schematic of the decision logic circuit 12. Resistor R6 and diode D1 pass only positive voltages to the rest of the circuit. Negative voltages correspond to cases where the current is leading, and no compensation capacitors are needed. Thus the range of these held values is 0 to 8 volts. This range must be divided into eight sections, corresponding to the eight different values of total capacitance that can be switched (zero to $7 \times C0$, as in equation (2) and Table 1.

The resistor ladder (R7-R14) is used to divide this range into 8 segments of voltage which correspond to a given switching setting. Since the ac voltage in the system is constant, the reactive current gives a measurement directly proportional to the reactive power demand.

As explained hereinbefore, switching must occur when the reactive power demand is $0.5*Q0$, $1.5*Q0$, ... up to $(2^n 0\ 1.5)*Q0$. For 3 capacitors per phase, $Q_{sc}$ is $7*Q0$, and switching points are $0.5*Q0/7$, $1.5*Q0/7$, ... $6.5*Q0/7$, as given in Table 1. Since a sampled 8.0 volt corresponds to $Q = Q_{sc} = 7*Q0$, the desired voltages are $(0.5/7)*8$, $(1.5/7)*8$, etc. or 0.57, 1.71, 2.86, 4.00, 5.14, 6.29, 7.43 V. The resistor ladder with the values shown in FIG. 8 set these voltages at the nodes between resistors, for a 10 volt supply. The resistor values are easily calculated by realizing that the same current flows through each resistor. This leads to a set of ratios for the resistors, where picking any one resistor value determines all the others.

These switching voltages are fed in as the negative input to a series of comparators 1 through 7, all of which receive +10 V and 0 volt has potentials shown for the comparators 7 and 1. The positive input to these comparators is the sampled voltage from the S&H circuit (FIG. 7). When the sampled voltage is higher than the set voltage for a given comparator, that comparator will have a high output. So for example, if the sampled voltage is 1.9 volts, comparators 1 and 2 would have high outputs, and the other outputs would be low (zero volts). These two high comparators indicate that the desired switching level is one that will furnish Q=2*Q0 of reactive power. If the sampled voltage is 7.9 volts, all comparators would be high, showing a need for all 3 capacitors to be switched in to give 7*Q0 of compensation.

The 4532 priority encoder 17 converts the 7 comparator outputs into a 3-bit binary number ranging from 000 to 111, one bit for each capacitor. The encoder outputs are labelled A2, A1 and A0, corresponding to the largest capacitor (C2=4*C0), the next smallest (C1=2*C0) and the smallest (C0), respectively. Table 3 shows all of the possible outputs of the encoder for the range of sample voltages.

TABLE 3

Encoder Response to Sampled Voltages

| Sampled Voltage | 4532 Inputs | | | | | | | Outputs | | |
|---|---|---|---|---|---|---|---|---|---|---|
| | D7 | D6 | D5 | D4 | D3 | D2 | D1 | A2 | A1 | A0 |
| V < .57 | 0 | 0 | 0 | 0 | 0 | 0 | 0 | 0 | 0 | 0 |
| 0.57 < V < 1.71 | 0 | 0 | 0 | 0 | 0 | 0 | 0 | 0 | 0 | 1 |
| 1.71 < V < 2.86 | 0 | 0 | 0 | 0 | 0 | 1 | 1 | 0 | 1 | 0 |
| 2.86 < V < 4.00 | 0 | 0 | 0 | 0 | 1 | 1 | 1 | 0 | 1 | 1 |
| 4.00 < V < 5.14 | 0 | 0 | 0 | 1 | 1 | 1 | 1 | 1 | 0 | 0 |
| 5.14 < V < 6.29 | 0 | 0 | 1 | 1 | 1 | 1 | 1 | 1 | 0 | 1 |
| 6.29 < V < 7.43 | 0 | 1 | 1 | 1 | 1 | 1 | 1 | 1 | 1 | 0 |
| V > 7.43 | 1 | 1 | 1 | 1 | 1 | 1 | 1 | 1 | 1 | 1 |

In this way, the sampled current value is easily converted into a code for switching the appropriate capacitors. Each cycle, a new value is sampled and a new switching code generated. So the system can respond to changes every clcle. Three D-type Flip-flops in a latch circuit 18 are used to latch the desired on/off state value for each capacitor of phase A. The outputs of the encoder are fed directly into D-type flip-flops which are used in triggering phase A capacitors. The state for each is latched soon after the current is sampled and the code generated. The content of these phase A latches are then fed to other latches (not shown) for selection of phase B and C capacitors. The appropriate timing signals controlling these latches will be discussed hereinafter with reference to FIG. 10.

The switching circuit 13 (FIG. 5) uses the latched outputs from the decision logic 12, and from these switches on the capacitors called for by the output code word of the priority encoder 17 (FIG. 8). The switches are carefully timed for turn-on so that the switching process will not add any harmonic or transient currents to the system.

Figure 9:
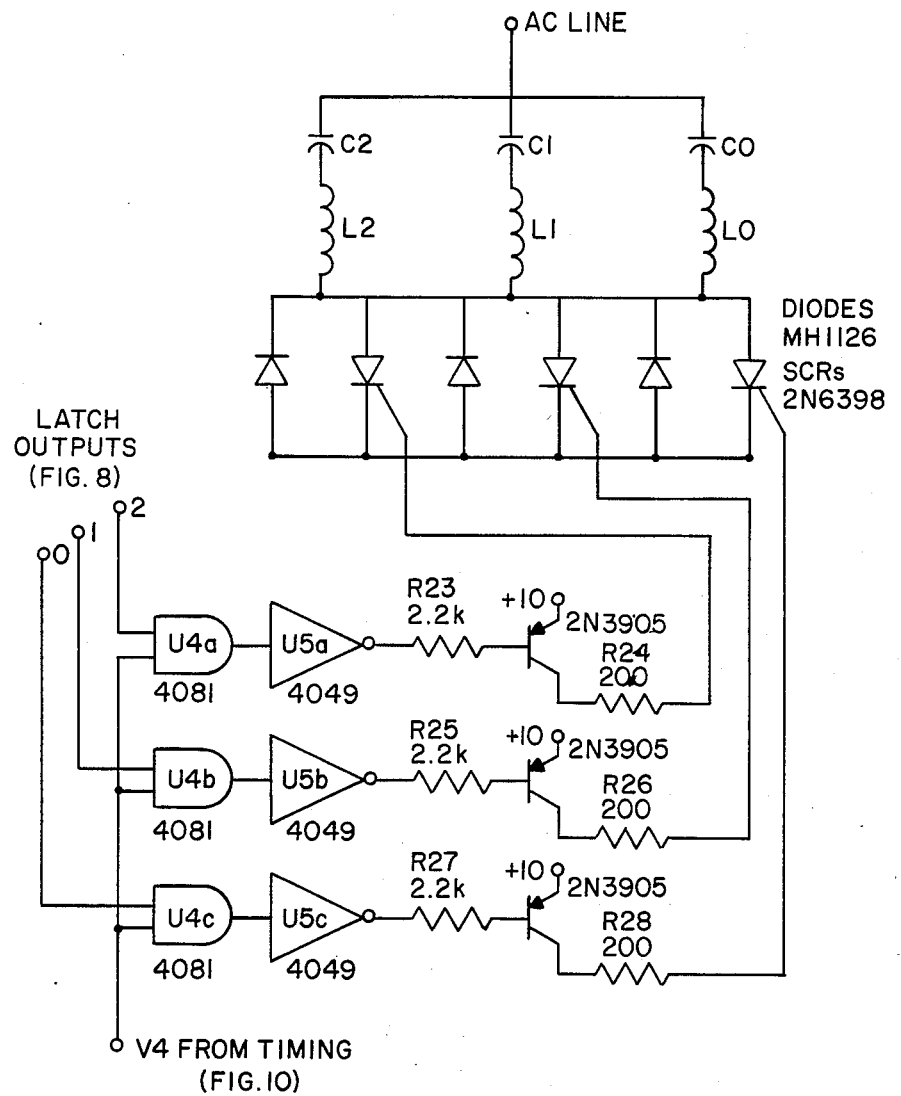
FIG. 9 illustrates the switching circuit of FIG. 5 for one phase (other switching circuits are provided for the other phases.

The switching circuit for phase A is shown in FIG. 9. First consider the silicon controlled rectifier (SCR)/diode pairs $D_o$, $SCR_o$; $D_1$, $SCR_1$; and $D_2$, $SCR_2$. These are the actual switches for the capacitors C0, C1, C2. Assume that the capacitor is not to be switched on the next cycle. During the negative half of the voltage cycle on the phase A line, the capacitor charges (negatively) through the diode. If no gate signal is commanded for the SCR, no current flows during the positive (or the negative) part of the cycle. The capacitor simply remains charged to the maximum negative voltage of the cycle. There will be no change in this condition until the SCR is switched. Thus a given capacitor is kept off line until the appropriate command turns its SCR switch on.

Once the capacitor has charged up through the diode, the voltage across the SCR will be positive throughout the whole cycle, except at the negative peak of the phase voltage cycle, when the potential across the SCR goes to zero. To avoid large transient current into the SCR which could burn it out (excessive di/dt), the SCR is only turned on at this negative peak in the phase voltage. This is also the natural zero crossing of the capacitor current. In addition, small inductors (100 microhenry) L0, L1, L2, have been added in series with the capacitors C0, C1, C2, to further protect the switch against excessive inrush current, in case the turn-on should occur with some positive voltage across the SCR. This value of inductance will limit current rise to less than 1 A/μs for up to a 100 volt mismatch at turn-on. The diode in antiparallel with the SCR insures that the SCR is never reverse biased, so turn-off problems are avoided. Thus no additional snubbing circuitry is needed for the switch. In addition, this method of turning the SCR on at the natural zero crossing of the capacitor current should avoid generating any harmonic currents by the switching of SCRs.

This switching format assumes that all SCRs can have their cathodes tied to a common point. This requires that the switching capacitors be configured in wye, with the neutral connected to the neutral of the induction machine. While this requires the machine's neutral to be available (or brought out), it greatly simplifies the SCR triggering. If the switching capacitors are connected in delta, there would be no common point, and all gate signals would have to be isolated from one another through trigger transformers or some other device.

The other electronic devices in FIG. 9 are used to control the SCR gate current. V4 is a timing signal that goes high at the negative peak of the phase A voltage waveform. This signal and the capacitor's latch are input to AND gates (U4a, b or c). If the capacitor is to turn on, the corresponding latch signal is high, and the inverter-buffers (U5a, b, or c) will go low at the correct time, turning on the respective pnp transistors. The combination of resistors R23 and R24 insure that the pnp transistor turned on will be saturated, and will supply about 45 ma gate current to the SCR. This gate signal is removed one-quarter cycle after it begins. Once the SCR turns on, current will flow in that branch for the complete cycle, using the diode for the current path when the current in the capacitor reverses direction.

TIMING CIRCUITRY

The timing circuitry 14 (FIG. 5) supplies the rest of the system with the correct waveforms to insure that everything happens at the correct points in the cycle. Incorrect timing could lead to incorrect capacitor values being switched, or to turning on the switches at wrong times, which could be destructive.

Figure 10:
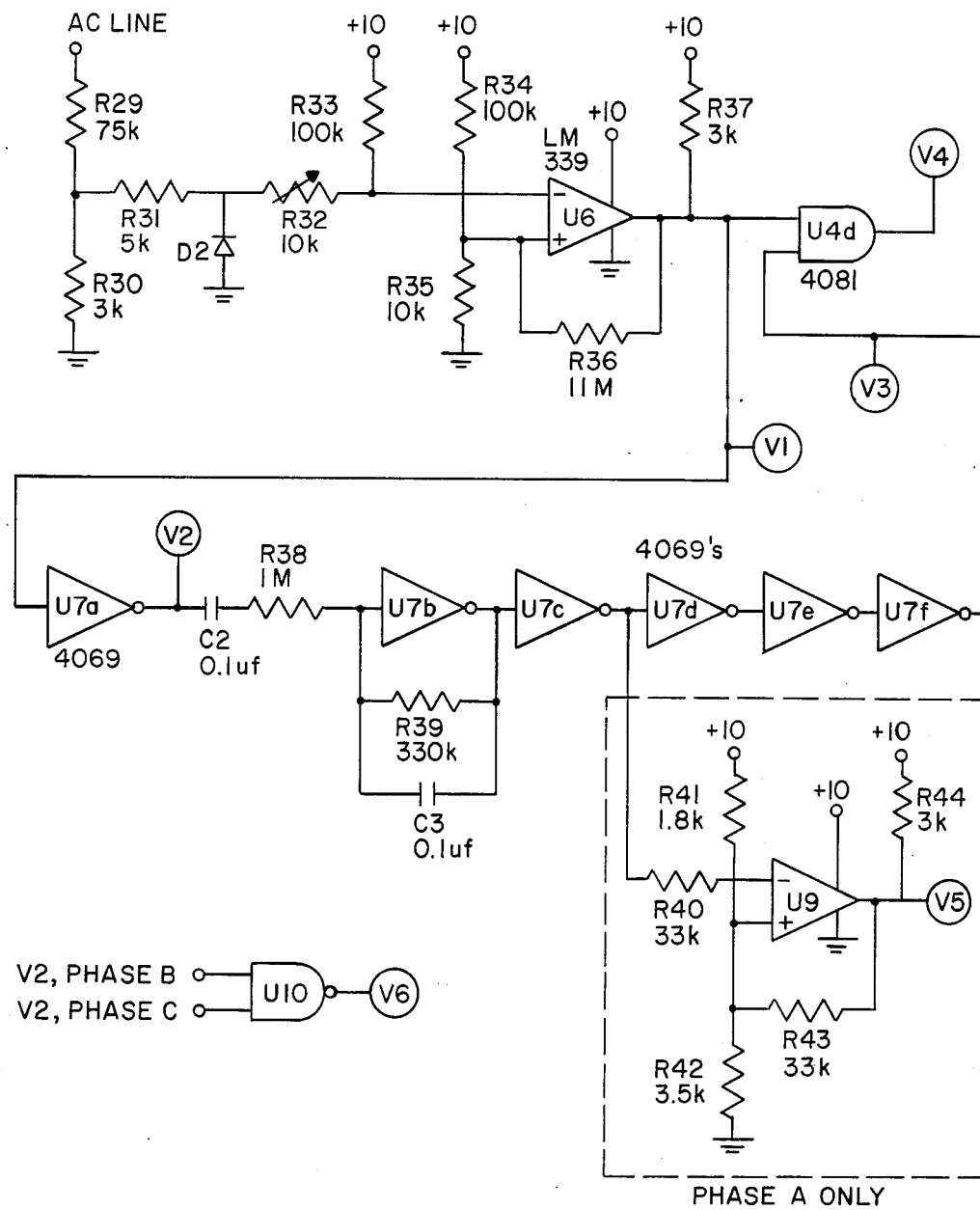
FIG. 10 illustrates the timing circuit of FIG. 5.
Figure 11:
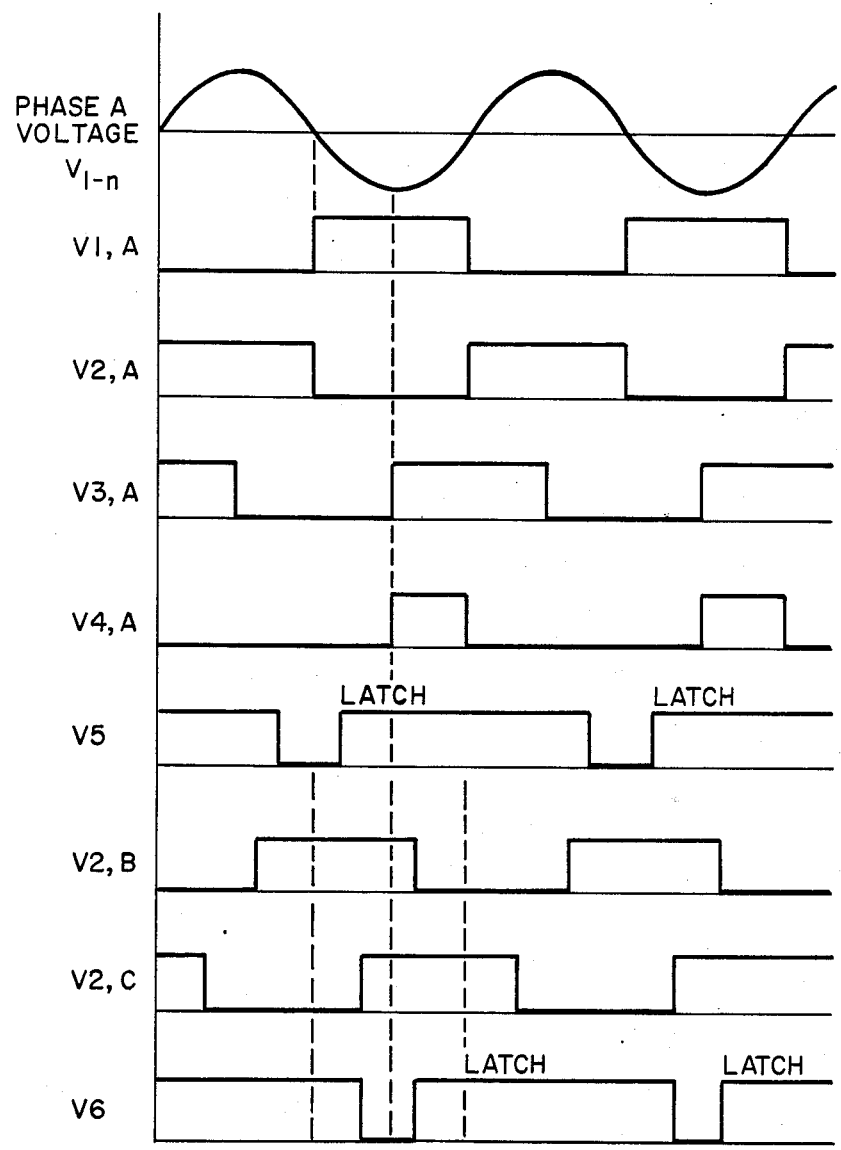
FIG. 11 illustrates a timing diagram for the circuit of FIG. 10.

The timing schematic is shown for phase A in FIG. 10. Most of the circuit is repeated for the other two phases, namely the circuit from the AC line to the generation of V2 through V4 for each of the phases B and C as shown in the timing diagram of FIG. 11. The input voltage could be coupled from the line via a step-down transformer, but since isolation is not important in this circuit the resistors R29 and R30 are used to form a simple and inexpensive voltage divider for the input. Comparator U6 is used to give a squared and inverted version of the input voltage. A resistor R32 is adjusted to close to 5k, so that $(R31+R32)/R33=R35/R34$. When this equation is satisfied, the comparator will change states when the input voltage crosses zero. Resistor R36 adds slight hysteresis to prevent oscillations around the zero crossing. The output V1 of phase A is shown in FIG. 11. Amplifier U7a inverts V1, giving V2 of FIG. 11 for phase A. As noted above, this circuit is repeated for phase B and for phase C. Note that the V2 signals for the phases A, B, and C are 120° out of phase, and that each is in phase with its line voltage.

A 90 degree phase shift from V1 is desired to turn on the SCRs for phase A. Inverters U7b-f are used to provide this phase shift. A single 4069 integrated circuit can be used to supply all 6 inverters on one chip. R38, U7b and C3 form an integrator, with R39 serving to stabilize the integrator. V2 is capacitively coupled to this integrator by C2. U7c-f further amplify the magnitude and generate a square waveform of the U7b output, and the result is a square wave V3 shifted 90 degrees from V1. V3 and V1 are input to AND gate U4d, to give V4, a wave which goes high at the negative peak of the voltage, and stays high one quarter cycle (until the phase voltage goes to zero). It is this wave that is used to control the timing of the SCR gate signals for phase A (see FIG. 9).

There are only three other timing signals used in the circuit from the circuit of FIG. 10. Signal V2 is one of them; it is fed to the trigger of the S&H circuit (FIG. 7) for phase A only. The S&H circuit will sample the input current while signal V2 is high, and then it locks on the value at the voltage zero crossing when V2 goes low. This signal V2 must come from phase A, which is assumed to be the same phase from which the current is measured.

The other two timing signals provide clocking signals for the latches. The output of amplifiers U7c is fed into comparator U9. With resistors R41-R43 as shown, the comparator acts like a Schmitt trigger, producing the waveform V5 shown in FIG. 11. V5 serves as the clock for the latches of phase A (FIG. 8). These flip flops will latch at the rising edge of V5, which occurs soon after the sample and hold has locked onto its hold value. The phase A latch outputs are fed to the phase B and C latches (not shown in FIG. 8). The clocking signal V6 for these final latches comes from using the signals V2 from both phases B and C as the inputs of NAND gate U10, as shown in FIG. 10. This allows latches for phases B and C to latch to their correct states during a time which is otherwise unimportant in their cycles. This insures that all corresponding latches for the three phases are identical, and that no latches are changed during times when their SCRs should be firing. Only one circuit shown in FIG. 10 is needed for the three phases to produce signals V5 and V6, while all of the rest of FIG. 10 is repeated for each phase B and C to produce the V2 inputs to NAND gate U10 that produces the signal V6 and the V4 inputs to the switching circuits for phase B and phase C capacitors corresponding to the switching circuit for phase A shown in FIG. 9.

THE HARMONIC PROBLEM

Early tests to examine the SCR switching of the capacitors revealed the presence of observable harmonics in the system. By using a spectrum analyzer, it was shown that the ac supply to the building contained harmonic voltages, with the third and fifth components dominating.

The harmonic content in the supply voltages was a problem that could not be avoided. These harmonics were probably due to several sources, such as saturation in transformers, electric arc furnaces, etc. Attempts were made to find a harmonic free source; for example, a laboratory synchronous generator was tested as a possible clean source, but it had a harmonic content similar to the supply from the utility.

The harmonic amplitudes in these supply voltages are not normally a problem for most loads. However, the use of capacitors in shunt across a supply voltage with harmonics has the effect of amplifying the harmonic currents in the supply line, since capacitive reactance decreases with increasing frequencies. If the amplitudes of the fundamental and nth harmonic in the voltage are equal, then the nth harmonic current in the capacitor will be n times as large as the fundamental current. Thus voltage harmonics lead to larger current harmonics.

The presence of excessive harmonic current could have two major undesireable effects. They could cause telephone interference, and could lead to losses or damage in equipment such as capacitors or transformers. Harmonic currents can lead to extra losses in induction machines. Note, however, that the presence of shunt capacitors does not add to current harmonics in the generator, since the condition of the supply voltage at the machine terminals will not change.

In laboratory testing, the current harmonics observed did not have a large adverse effect on the actual operation of the controller circuit. However, the harmonics created two problems that apply directly to this circuit. The first problem deals with the fact that the line current is sampled at the instant the phase voltage crosses zero. With the presence of high frequency harmonics, the line current can be making rapid, though small fluctuations at any point, rather than being the desired smooth sine wave. This can lead to inaccurate sampling. This problem was minimized by two factors. One is that fluctuations would be averaged out over many cycles. The second factor is that odd harmonic currents will have a real component that goes to zero as the phase voltage goes to zero, just as with the fundamental. Therefore the sampled values should still give a true indication of the reactive current amplitude.

The other problem presented by the harmonics is that measuring the total reactive power is now a more complex procedure. With no harmonics, apparent power S, real power P and reactive power Q are related by $$S^2 = P^2 + Q^2. \tag{13}$$

But with harmonics, a distortion power D exists, which gives the power content in all of the harmonics. In this case equation (13) is modified to $$S^2 = P^2 + Q^2 + D^2. \tag{14}$$

Reactive power meters can only yield a quantity equal to $\sqrt{Q^2+D^2}$ containing both reactive and distortion power. Hereafter the distortion power is just lumped together with Q, and these two terms together are referred to as the reactive power. The distortion power did not turn out to be a large problem; when the circuit was used, the reactive power term was minimized, though it did not go quite as close to zero as expected, and the current at the zero crossing of voltage was very close to zero. In other words, the system appeared to be operating very close to unity power factor.

We claim:

1. A reactive power compensating system for a three phase induction machine comprising
   an array of switchable capacitors connected to a power line of each phase,
   means for measuring the reactive power drawn by said induction machine,
   logic decision means responsive to said measuring means for selecting the capacitors of each array required to compensate for the said reactive power drawn by said induction machine, and
   means responsive to said logic decision means for switching the said selected capacitors of each array onto the power line associated with the array
   wherein said reactive power measuring means is comprised of means for sensing the current through a power line of only one phase, means for converting the current sensed into a proportional voltage signal, and means for sampling and holding for at least a half cycle said proportional voltage signal when the voltage of said one phase crosses zero.

2. A reactive power compensating system as defined in claim 1 wherein each of said array of capacitors is connected in a configuration that places selected capacitors between the associated phase line and a neutral line with the three arrays thus connected in a wye configuration.

3. In a multiphase power system for an induction machine, apparatus for reactive power compensation comprising
   means for sensing and holding the current amplitude of one phase line at the time the voltage of said one phase line crosses zero,
   an array of compensation capacitors for each phase,
   switching means for connecting each compensation capacitors to a phase,
   decision logic means responsive to the current amplitude sampled and held for selecting which of said capacitors should be connected in parallel between each phase line and a neutral line,
   means for timing the connection of said compensation capacitors to each of said phase lines such that connection of said capacitors is permitted to occur only at times such that the voltage of said phase is crossing zero, and
   means responsive to said decision logic means and said means for timing for activating said switching means such that the compensation capacitors selected by said decision logic means are connected to each phase.

4. Apparatus as defined in claim 3 wherein said decision logic means determines a binary coded word having one bit for each capacitor to be selected, and said compensation capacitors for each phase are sized such that the capacitance each possesses is proportional to the place value of said associated binary bit within said binary coded word, whereby up to n compensation capacitors may be selected in combination to provide 2 levels of compensation.

5. Apparatus as defined in claim 4 wherein said decision logic means for said one phase stores the binary coded word determined for said one phase for use of the remaining phase lines in sequence.

6. Apparatus as defined in claim 5 wherein said multiphase power system is three phase and said timing means for each phase line controls connection of compensation capacitors in successive phases spaced 120° apart, all in response to sampling and holding one phase from which one binary code word is determined for said one phase, and stored in separate latches for use in control of selecting and connecting compensation capacitors for the other two phases at successive 120° and 240° phase angles with respect to said one phase.

7. Apparatus as defined in claim 6 wherein said timing means includes means for latching said binary code word for the other two phases during a half cycle following the sample and hold of said one phase, and said timing means includes means for producing timing signals at 120° and 240° in respect to said one phase for selecting and connecting said compensation capacitors.

8. Apparatus as defined in claim 5 including a separate fixed compensation capacitor connected to each phase line for the minimum compensation required, whereby said decision logic means is employed to determine only the additional compensation required by each phase.

9. A reactive power compensating system for an n-phase induction machine comprising
   an array of switchable capacitors connected to a power line of each phase,
   means for measuring the reactive power drawn by said induction machine, and
   logic decision means responsive to said measuring means for selecting the capacitors of each array required to compensate for the said reactive power drawn by said induction machine, and means responsive to said logic decision means for switching the said selected capacitors of each array onto the power line associated with the array,
   wherein said reactive power measuring means comprises means for sensing the current through a power line of one phase, means for converting the current sensed into a proportional voltage signal, and means for sampling and holding for at least a half cycle said proportional voltage signal when the voltage of said one phase crosses zero.

* * * * *